Feb. 19, 1963 R. H. WENTORF, JR 3,078,232
PROCESS FOR MAKING CONDUCTING CUBIC BORON
NITRIDE AND PRODUCT THEREFROM
Filed Jan. 18, 1960
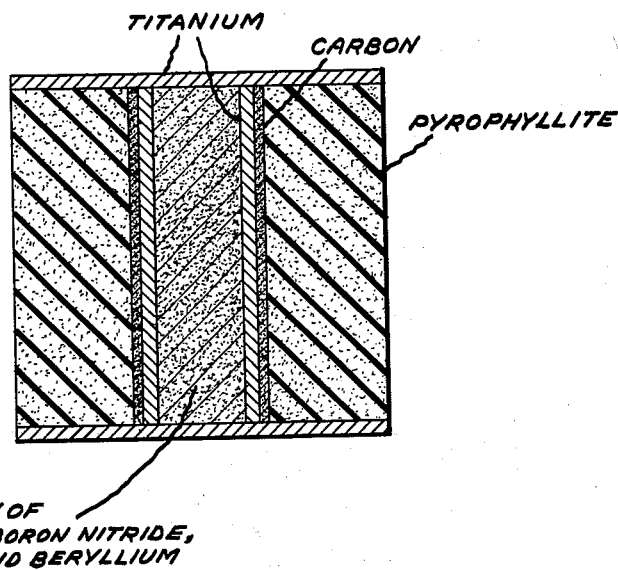
Inventor:
Robert H. Wentorf Jr.,
by Joseph T. Cohen
His Attorney.

┌─────────────────────────────────────────────────────────────┐

United States Patent Office 3,078,232
Patented Feb. 19, 1963

3,078,232
PROCESS FOR MAKING CONDUCTING CUBIC BORON NITRIDE AND PRODUCT THEREFROM
Robert H. Wentorf, Jr., Schenectady, N.Y., assignor to General Electric Company, a corporation of New York
Filed Jan. 18, 1960, Ser. No. 2,978
6 Claims. (Cl. 252—62.3)

This invention is concerned with electrically conducting cubic boron nitride and methods for making the same. More particularly, this invention relates to a cubic boron nitride of an electrically conducting nature, which can be prepared by heating at elevated temperatures and pressures hexagonal boron nitride or source of hexagonal boron nitride in the presence of beryllium, employing the usual catalyst for conversion of the starting boron nitride to the cubic boron nitride state.

In my copending application, Serial No. 707,434, filed January 6, 1958, now U.S. 2,947,617, issued August 2, 1960, and assigned to the same assignee as the present invention, there is described and claimed an abrasive material comprising cubic boron nitride. This cubic boron nitride, which has an atomic configuration corresponding to the atomic configuration of zinc blend (ZnS), is prepared by converting the common form of boron nitride, for instance, hexagonal boron nitride, to the cubic form under the action of heat and pressure in the presence of at least one catalyst selected from the class consisting of alkali metals, alkaline earth metals, tin, lead, antimony and nitrides of the foregoing metals, the pressures and temperatures being selected so as to be in the range in which the catalyst is operative to catalyze the conversion of ordinary boron nitride to cubic boron nitride. This cubic boron nitride is different from the usual hexagonal boron nitride (which is a relatively soft powdery material and therefore completely useless for abrasive purposes) by having a cubic crystalline configuration analogous to the configuration of zinc blend and having a unit cell edge length of approximately 3.615 Angstroms. This cubic boron nitride has a hardness substantially equal to the hardness of diamond and is thermally stable at a temperature even as high as around 2000° C.

In general, the reaction whereby the usual boron nitride is converted to the cubic boron nitride is carried out in the cubic boron nitride stable region at a temperature of at least about 1200° C. and preferably between 1200° C. to 2200° C. at a pressure above about 50,000 atmospheres, for instance, about 55,000 to 110,000 atmospheres or more. A more preferred narrow range of reaction conditions is within a temperature range of from 1500 to 2100° C. at a pressure of about 60,000 atmospheres to 100,000 atmospheres. More particular directions for carrying out the conversion of the usual boron nitride to the cubic boron nitride form (such as catalyst, nitride source, catalyst source, apparatus, etc.) are found in my aforesaid earlier filed application, Serial No. 707,434, and by reference, this application is made a part of the disclosures of the instant application.

When one forms the cubic boron nitride from the usual boron nitride, one finds that the cubic boron nitride is substantially non-conducting electrically, i.e., it has a specific resistance greater than $10^{12}$ ohm-centimeters. Unexpectedly, I have discovered that by incorporating a small amount of beryllium with the usual boron nitride and a catalyst for conversion of the latter to the cubic boron nitride form, I am able to obtain an electrically conducting cubic boron nitride whose conductivity varies with the catalyst used and with the concentration of the beryllium employed. This was entirely unexpected and in no way could have been predicted because when, for instance, magnesium or calcium was used in place of the beryllium, no difference in the conductivity of this cubic boron nitride could be detected.

Generally, I may use from about 0.001 to as high as 10 percent, by weight, or more of beryllium, such as a minor weight amount, based on the weight of the starting boron nitride, namely, the hexagonal boron nitride. Instead of employing beryllium itself as the additive for obtaining conducting cubic boron nitride, one can also use compounds of beryllium, which under the conditions of the reaction at the elevated temperatures and pressures, are converted to the metallic beryllium state. Included among such beryllium compounds may be mentioned, for instance, beryllium halides (e.g., beryllium chloride, beryllium bromide, beryllium iodide, etc.), beryllium carbonate, beryllium nitrate, beryllium oxide, beryllium stearate, beryllium nitride, beryllium sulfate, etc. In any event, it is to be understood that whether one starts with the beryllium initially or with a compound of beryllium decomposable to the metallic state, the additive causing the electrical conductivity in the cubic boron nitride is the beryllium metal. For brevity, the term "beryllium" is intended to include in the specification and claims, not only beryllium itself, but also compounds of beryllium decomposable to the metallic state. By varying the weight of the beryllium, I have been able to obtain cubic boron nitride crystals having specific electrical resistances within the range of from $5 \times 10^3$ to $5 \times 10^6$ ohm-centimeters as contrasted to the usual $10^{12}$ ohm-centimeters or higher specific resistance for unmodified cubic boron nitride.

The use of the beryllium in making the conducting cubic boron nitride also results in an additional advantage. Thus, whereas the usual cubic boron nitride crystals made in the manner described in my aforementioned earlier filed patent application, Serial No. 707,434, are usually black, brown, yellow or colorless, the presence of the beryllium causes the cubic boron nitride to be blue in color.

In making the cubic boron nitride having the electrically conducting properties, it is only essential that one mix and form a homogeneous mixture of the hexagonal boron nitride, the specific catalyst employed, and the beryllium, all preferably in the finely divided state, and thereafter effect the pressing at elevated temperatures and pressures to obtain the electrically conducting cubic boron nitride. Alternatively, one can start with cubic boron nitride, mix it with the beryllium and catalyst, and at elevated temperatures and pressures at which the cubic boron nitride is formed, the latter is reconstituted to form cubic boron nitride having the desired electrical conductivity. An apparatus suitable for carrying out the high temperature, high pressure reaction required to form the electrically conducting cubic boron nitride is found described in the copending application of H. Tracy Hall, Serial No. 707,432, filed January 6, 1958, now U.S. 2,941,248 issued June 21, 1960, and also is found described in my above-identified copending application, Serial No. 707,434. As pointed out in my above earlier filed application, the catalyst used in making the conducting cubic boron nitride may be employed in the form of coarse or fine powders, or as a tube within which the hexagonal boron nitride and the beryllium are introduced, the tube itself acting as a catalyst for the conversion of the hexagonal boron nitride to the cubic boron nitride. Titanium, tantalum or carbon tubes may also be used to contain the ingredients.

I have found that certain advantages are to be derived in using certain types of assemblies for effecting conversion of the hexagonal boron nitride (or other source of the non-cubic form of boron nitride) to the cubic boron nitride state. In particular, I have found that the mixture of the hexagonal boron nitride, beryllium, and catalyst for conversion of the boron nitride to the cubic form is advantageously introduced into a titanium or tantalum tube, preferably a titanium tube because of the economic considerations involved, prior to placing the mixture of ingredients in the press more particularly described in my earlier filed application more specifically referred to above. Under the conditions of the reaction, the titanium or tantalum is converted to the nitride or boride forms, for instance, titanium nitride and/or titanium boride (as well as the tantalum nitride and/or tantalum boride) which take on a refractory hard state preventing leakage of the contents of the tube. In the absence of such an assembly, whereby the reaction ingredients are merely placed in a tube comprising the compressible gasket, for instance, a tube of pyrophyllite, there are losses encountered resulting in reduced yields of the conducting cubic boron nitride due to leakage. When employing the titanium tube, it is also desirable that the titanium tube be incased in a conducting yea protective casing, for instance, a tube of carbon, to prevent undue oxidation, i.e., deterioration, of the titanium tube which would obviously defeat the purpose in using the titanium tube or vessel.

The amount of catalyst used may vary widely. Preferably, one employs from about 0.1 to 1 part catalyst per part of the hexagonal boron nitride, although it is obvious that one can employ larger or smaller amounts of the catalyst per part of boron nitride without departing from the scope of the invention. The larger amounts of catalyst will reduce the amount of cubic boron nitride formed, and ordinarily this excessive amount of catalyst is not essential. Generally, it is only necessary to place the mixture of the beryllium, catalyst, and hexagonal boron nitride in the press in a suitable reaction vessel such as a tantalum or graphite tube or even a tube made from the catalyst metal (in which case no additional catalyst is needed) and subject the assembly to a pressure within the range described above for about 5 to 30 minutes to form the electrically conducting cubic boron nitride.

In order that those skilled in the art may better understand how the present invention may be practiced, the following examples are given by way of illustration and not by way of limitation. All parts are by weight.

In these examples, the high pressure, high temperature apparatus used was that described in my copending application, Serial No. 707,434. In general, the manner of carrying out the high pressure and high temperature reactions was as follows. Hexagonal boron nitride, beryllium (or beryllium oxide) and the catalyst, all in the finely divided state, were placed in a titanium tube open at both ends and whose dimensions are more specifically recited in the following examples. The titanium tube was encased in a close fitting spectroscopic arc (high purity) carbon tube and this assembly in turn was placed in another snugly fitting tube comprising the compressible ceramic, specifically pyrophyllite, described in my aforementioned application, Serial No. 707,434. End caps or disc closures of titanium metal (about 0.01 to 0.02 inch thick) were placed at each end of the titanium tube so that the end caps covered the end surfaces of the titanium tube, the carbon tube, and the pyrophyllite tube, as is more particularly described in the attached drawing in which the single cross-sectional figure shows the relationship of the three nesting tubes. After carrying out the high temperature, high pressure reaction, the cubic boron nitride was separated by dissolving the matrix in which cubic boron nitride was formed, in hydrochloric acid or aqua regia. This resulted in most cases in a mixture of cubic boron nitride with some unreacted hexagonal boron nitride. The cubic boron nitride was separated from the hexagonal material by hand, or by using a filtration technique in which the mixture was added to bromoform in which the hexagonal boron nitride would float and in which the cubic boron nitride sinks. In all these tests, resistance heating was employed by bringing the reactants to the desired temperature. Establishing the formation of cubic boron nitride was by X-ray crystallography, refractive index, density, chemical analysis, and hardness tests. The conductivity (or specific resistance) was established by the probe technique which is a well known means for determining conductivity. The semiconducting properties were established by thermoelectric power measurements.

*Example 1*

In this example, 1 part beryllium, 40 parts lithium nitride ($Li_3N$) and 150 parts hexagonal boron nitride all in powder form, were intimately mixed together and placed in a titanium capsule (or tube) approximately 0.4 inch in diameter and 0.93 inch long. The titanium tube and its contents were then placed in a snugly fitting carbon tube (about 0.45 inch in diameter) which in turn was placed in a pyrophyllite tube as described previously. An end cap of titanium was placed across each end of the assembly as shown in the accompanying drawing. The total assembly was pressed for 15 minutes at about 74,000 atmospheres and about 2000° C. At the end of this time, the cubic boron nitride thus formed was isolated, and was identified by its crystalline cubic habit, refractive index, and hardness, as being cubic boron nitride, and conformed in every respect to the crystal structure of the cubic boron nitride recited in my aforesaid application, Serial No. 707,434. However, in contrast to the usual substantially non-conducting cubic boron nitride, the cubic boron nitride formed as a result of carrying out the process in the instant example was quite conducting and had a specific resistance within the range of $1 \times 10^6$ to $5 \times 10^6$ ohm-centimeters. The color of this conducting cubic boron nitride was a deep blue.

*Example 2*

In this example the same procedure and equipment were used as in Example 1 with the exception that there were employed 0.3 part beryllium, 70 parts lithium nitride, and 140 parts hexagonal boron nitride. In addition, the conditions of pressure were about 65,000 atmospheres and a temperature of about 2000° C. Again, the product obtained was cubic boron nitride having a blue coloration and on test showed a specific resistance of about $1 \times 10^4$ to $10^6$ ohm-centimeters.

*Example 3*

In this example the same process and apparatus were used as in Example 1 with the exception that there was employed instead 0.05 part beryllium, 70 parts lithium nitride, and 140 parts hexagonal boron nitride. In addition, the conditions of pressing were at about 59,000 atmospheres at a temperature of approximately 2100° C., while the pressing was for 30 minutes. This yielded cubic boron nitride crystals part of which were dark blue and part pale blue in color. Again, the cubic boron nitride exhibited the low specific resistance charatceristic of the cubic boron nitride described in Examples 1 and 2.

*Example 4*

In this example the same apparatus was employed as in Example 1. However, in the instant example, 7 parts lithium nitride and 10 parts hexagonal boron nitride were used. Furthermore, approximately 20 parts, by weight, of beryllium oxide (BeO) was used in place of the beryllium metal employed in Example 1. The conditions of pressing were at about 63,000 atmospheres and approximately 1700° C. This resulted in a blue colored cubic boron nitride exhibiting the low specific resistance (i.e. the high conductivity) characteristic of cubic boron nitride prepared in the usual manner employing initially metallic beryllium.

*Example 5*

In this example a titanium tube was employed similarly as was done in the previous examples with the exception that the titanium tube was about 0.13 inch in diameter and 0.450 inch long. The titanium tube was placed inside the carbon tube (aobut 0.16 inch in diameter and about 0.45 inch long) and the latter inserted inside a pyrophyllite tube. Prior to pressing the tubes and applying the titanium end plates, the titanium tube was packed with a homogeneous mixture of 1 part lithium nitride, 1 part finely divided beryllium powder, and about 3 parts hexagonal boron nitride. The titanium tube and its contents were subjected to a pressure of about 70,000 atmospheres and a temperature of about 1700° C. for about 8 minutes. The resulting product was identified by the various means cited above as cubic boron nitride and was found to have a blue coloration varying from pale blue to dark blue in the various crystals thereby obtained. This material was found to have a high conductivity as evidenced by the fact that its specific resistance was below 1 megohm-centimeter. The blue cubic boron nitride was found to have p-type semi-conducting properties when measured for example in the manner described in "Introduction to Semiconductors" by W. Crawford Dunlap, published by John Wiley and Sons, Inc., New York, N.Y. (1957).

*Example 6*

In this example the same apparatus was employed as in Example 5. The proportions of ingredients was varied so that 1 part beryllium, 4 parts lithium nitride, and 16 parts hexagonal boron nitride were introduced into the titanium tube and the entire assembly (with titanium end caps) and its contents subjected to a pressure of approximately 70,000 atmospheres at a temperature of about 1600° C. for 10 minutes. At the end of this time the reaction product was treated to isolate dark blue cubic boron nitride crystals (identified as such by the tests previously recited) which were found to have a specific resistance of approximately 0.04 to 0.4 megohm-centimeter. Again, the crystals exhibited strong semiconducting characteristics of the p-type.

It will, of course, be understood by those skilled in the art that in addition to using the lithium catalyst above, other catalysts may be employed, many examples of which have bene recited above without departing from the scope of the invention. The conditions may be varied as well as the concentration of the beryllium and of the catalyst materials, without in any way affecting the scope of the invention herein defined and claimed. Instead of using lithium nitride as catalyst, similar results are obtained using tin and magnesium nitride as the catalyst.

Electrically conducting cubic boron nitride herein prepared has many uses. Primarily because of the fact that it has a p-type conductivity, the electrically conducting cubic boron nitride is useful as semiconductors and semiconducting devices such as transistors, rectifiers, thermometers, etc. Additionally, they can also be used as electroluminescent bodies for light sources or as high energy particle counters. The fact that the cubic boron nitride is electrically active recommends its use as a high temperature catalyst for oxidation or recombination reactions.

What I claim as new and desire to secure by Letters Patent of the United States is:

1. P-type conducting cubic boron nitride having incorporated therein a sufficient amount of beryllium up to 10 percent, by weight, to impart to the cubic boron nitride a specific resistance of less than $10^{12}$ ohm centimeters.

2. The process for making electrically conducting cubic boron nitride which comprises heating hexagonal boron nitride at a pressure of at least 50,000 atmospheres and at a temperature of at least 1200° C. in the presence of a catalyst selected from the class consisting of alkali metals, alkali earth metals, lead, antimony, tin and nitrides of the foregoing metals, employing in addition to said catalytic materials, from 0.001 to 10 weight percent of beryllium, based on the weight of the boron nitride.

3. The process of claim 2 in which the catalyst is lithium nitride.

4. The process of claim 2 in which the catalyst is tin.

5. The process of claim 2 in which the catalyst is magnesium nitride.

6. The process of making an electrically conducting cubic boron nitride having p-type semiconductor characteristics which comprises introducing a mixture containing as essential ingredients hexagonal boron nitride, beryllium, the beryllium being present in an amount of from 0.001 to 10 percent, by weight, based on the weight of the hexagonal boron nitride, and a catalyst for the conversion of the hexagonal boron nitride to cubic boron nitride selected from the class consisting of alkali metals, alkaline earth metals, lead, antimony, tin and nitrides of the foregoing metals, into a titanium tube and thereafter subjecting the titanum tube and its contents to a pressure of at least 50,000 atmospheres and a temperature of at least 1200° C.

References Cited in the file of this patent

UNITED STATES PATENTS

| | | |
|---|---|---|
| 2,428,992 | Ransley et al. | Oct. 14, 1947 |
| 2,798,989 | Welker | July 9, 1957 |
| 2,845,515 | Anderson et al. | July 29, 1958 |
| 2,947,617 | Wentorf | Aug. 2, 1960 |